US009087198B2

(12) United States Patent
Ekberg et al.

(10) Patent No.: US 9,087,198 B2
(45) Date of Patent: Jul. 21, 2015

(54) METHOD AND APPARATUS TO RESET PLATFORM CONFIGURATION REGISTER IN MOBILE TRUSTED MODULE

(75) Inventors: Jan-Erik Ekberg, Vanda (FI); Nadarajah Asokan, Espoo (FI); Kari Kostiainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 506 days.

(21) Appl. No.: 13/578,955

(22) PCT Filed: Feb. 14, 2011

(86) PCT No.: PCT/FI2011/050134
§ 371 (c)(1),
(2), (4) Date: Aug. 14, 2012

(87) PCT Pub. No.: WO2011/101538
PCT Pub. Date: Aug. 25, 2011

(65) Prior Publication Data
US 2012/0311315 A1 Dec. 6, 2012

Related U.S. Application Data

(60) Provisional application No. 61/305,023, filed on Feb. 16, 2010.

(51) Int. Cl.
*H04L 29/06* (2006.01)
*G06F 21/00* (2013.01)
*G06F 21/57* (2013.01)

(52) U.S. Cl.
CPC ..................................... *G06F 21/57* (2013.01)

(58) Field of Classification Search
CPC ...................................................... G06F 21/57
See application file for complete search history.

(56) References Cited

U.S. PATENT DOCUMENTS

2003/0115453 A1* 6/2003 Grawrock ...................... 713/155
2003/0188113 A1* 10/2003 Grawrock et al. ............. 711/156
(Continued)

FOREIGN PATENT DOCUMENTS

| CN | 1656432 A | 8/2005 |
| CN | 101512535 A | 8/2009 |
| WO | 2008/026086 A2 | 3/2008 |

OTHER PUBLICATIONS

International Search Report received for corresponding Patent Cooperation Treaty Application No. PCT/FI2011/050134, dated Jun. 20, 2011, 6 pages.
(Continued)

*Primary Examiner* — Lisa Lewis
(74) *Attorney, Agent, or Firm* — Nokia Technologies Oy

(57) ABSTRACT

In accordance with the exemplary embodiments of the invention there is at least a method, apparatus, and executable program of computer instructions to perform the operations of establishing and initializing a set of platform configuration registers, where a first subset of platform configuration registers is defined as being non-resettable, and a second subset of platform configuration registers is defined as being resettable, storing initial boot-up system state information in one or more non-resettable platform configuration registers, dynamically resetting (2) a value of a platform configuration register identified by a reference integrity metric to reflect a measurement value provided by the reference integrity metric, and responding to an attestation request (0) with an attestation response (5) including dynamic information from the platform configuration register that was reset and system state information from a non-resettable platform configuration register.

16 Claims, 3 Drawing Sheets

(56) References Cited

U.S. PATENT DOCUMENTS

2005/0177749 A1* 8/2005 Ovadia ............................ 713/201
2006/0212939 A1* 9/2006 England et al. .................. 726/22
2009/0013406 A1* 1/2009 Cabuk et al. ..................... 726/22
2009/0307487 A1* 12/2009 Movva et al. .................... 713/156
2012/0324236 A1* 12/2012 Srivastava et al. ............. 713/189

OTHER PUBLICATIONS

Written Opinion received for corresponding Patent Cooperation Treaty Application No. PCT/FI2011/050134, dated Jun. 20, 2011, 7 pages.

International Preliminary Report on Patentability received for corresponding Patent Cooperation Treaty Application No. PCT/FI2011/050134, dated Aug. 21, 2012, 8 pages.

Ekberg J.E. et al. "Mobile Trusted Module (MTM)—an introduction", Nokia Research Center, NRC-TR-2007-015, Nov. 14, 2007 [Retrieved on Jun. 8, 2011], pp. 1-13.

Kil, C. et al. "Remote attestation to dynamic system properties: Towards providing complete system integrity evidence", Dependable Systems & networks, 2009. DSN '09. IEEE/IFIP International Conference on Jun. 29, 2009, pp. 115-124.

Extended European Search report received for corresponding European Application No. 11744317.6, dated Aug. 6, 2013, 6 pages.

"Trusted Platform Module Main Specification", Trusted Computing Group, v1.2, Level 2, Revision 103, Jul. 9, 2007, 710 pages.

McCune et al., "Flicker: An Execution Infrastructure for TCB Minimization", Proceedings of the 3rd ACM SIGOPS/EuroSys European Conference on Computer Systems, Apr. 1-4, 2008, pp. 315-328.

"TCG Mobile Trusted Module Specification", Trusted Computing Group, v1.0, Revision 6, Jun. 26, 2008, 105 pages.

"TCG Mobile Reference Architecture", Trusted Computing Group, v1.0, Revision 1, Jun. 12, 2007, 87 pages.

Office Action received for corresponding European Patent Application No. 11744317.6-1870, dated Mar. 4, 2014, 6 pages.

Office Action received for corresponding Chinese Patent Application No. 201180009539.8, dated Jun. 5, 2014, 9 pages of Office Action. No English Language Translation available.

* cited by examiner

METHOD AND APPARATUS TO RESET PLATFORM CONFIGURATION REGISTER IN MOBILE TRUSTED MODULE

RELATED APPLICATION

This application was originally filed as PCT Application No. PCT/FI2011/050134 filed Feb. 14, 2011, which claims priority benefit to U.S. Provisional Patent Application No. 61/305,023, filed Feb. 16, 2010.

TECHNICAL FIELD

The exemplary and non-limiting embodiments of this invention relate generally to trusted computing, security and the use of a mobile trusted module in, for example, a wireless communication system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

ASIC application specific integrated circuit
DRTM dynamic root of trust measurement
HW hardware
IMA integrity measurement architecture
I/O input/output
IV initialization vector
MRTM mobile remote-owner trusted module
MTM mobile trusted module
OS operating system
PCR platform configuration register
RIM reference integrity metric
RTM root-of-trust for measurement
SW software
TCB trustee computing base
TCG trusted computing group
TPM trusted platform module
TrEE trusted execution environment Reference with regard to MTM can be made to "Mobile Trusted Module (MTM)—an introduction", Jan-Erik Ekberg, Markku Kylämpää, Nokia Research Center, NRC-TR-2007-105, Nov. 14, 2007.

The TPM specification (Trusted Computing Group. Trusted Platform Module (TPM) Main Specification. Version 1.2 Revision 103, 9 Jul. 2007, http://www.trustedcomputing-group.org/resources/tpm_main_specification) previously introduced the "Dynamic Root of Trust" with the intent to support trusted hypervisors beneath operating systems. A hypervisor is basically a system program that provides a virtual machine environment. The main functionality of this specific feature is that an external, chip-dependent trigger resets a subset of the TPM PCRs, and launches code (residing in a temporarily secured memory location) into one of these PCRs. Thus, even if the machine had been running for some time when this event was triggered, there is a "fresh start" with respect to computation done by the measured code (assumed to be a hypervisor).

Over the last few years, the DRTM technology has in the research community found many further uses that do not relate to virtualization and hypervisors. Reference in this regard may be made to, for example, Jonathan M. McCune, Bryan J. Parno, Adrian Perrig, Michael K. Reiter, and Hiroshi Isozaki, "Flicker: An Execution Infrastructure for TCB Minimization", in Eurosys >08: Proceedings of the 3rd ACM SIGOPS/EuroSys European Conference on Computer Systems 2008, pages 315в328, New York, N.Y., USA, 2008. ACM. The concept that a code fragment can be securely measured (as well as its input and output) and executed in independence may be viewed as giving this system an aspect of a trusted execution environment (TrEE). Even without initializing a virtualization layer DRTM can be used within a single OS for credential calculations, secure storage, trusted I/O and other security features that are typically achieved using virtualization, external smart cards and processor secure environments such as ARM TrustZone.

DRTM as a concept combines isolation with a hardware-supported (PCR) reset functionality. The fact that the isolation is done by HW and not in SW has a major contribution to the achieved security level, although conceptually isolation can be achieved by either means. Thus, herein the concentration will be on state/PCR resetting.

The intermittent, so called "roller coaster use" of the DRTM is especially useful for services that have no, or a very weak relationship to the operating system state and/or state history. For example, assume that the user of a device needs to authenticate to a network or service, or needs to authorize a purchase. The service provider and even the device user may have no incentive to bind such a transaction to the device state, however at least the user has an incentive to protect the credential (and thus any related computation where, for example, a secret key takes part) used for authentication or authorization. The DRTM provides a well suited mechanism for this purpose. However, binding, for example, an OS mechanism to such a credential usage is unnecessary and most likely increases the complexity of such transactions.

Another class of services which benefit from DRTM relate to computer applications that typically by design are not persistent but rather launched and stopped at will, depending on the needs of the user. If such an application defines a system capability or feature worthy of attention, the traditional TPM approach can be crystallized by the OS adding TPM events/PCR updates on application launch/termination, producing a potentially infinitely long log of events that with the help of a complete TPM attestation can (in principle) be parsed to determine the current (application) state of the system. On the assumption that the OS has been securely booted or correctly measured in trusted boot, and serves as a measuring point (a part of the so called Root-of-Trust for Measurement (RTM)), the requirement that PCRs cannot be reset (for those PCRs that will denote application state in a given configuration) may be found to be unnecessary. DRTM has provided one (admittedly course-grained) solution for providing PCR resetting in the TPM domain.

SUMMARY

In an exemplary aspect of the invention, there is a method, comprising: establishing and initializing a set of platform configuration registers, where a first subset of platform configuration registers is defined as being non-resettable, and a second subset of platform configuration registers is defined as being resettable, storing initial boot-up system state information in one or more non-resettable platform configuration registers, dynamically resetting a value of a platform configuration register identified by a reference integrity metric to reflect a measurement value provided by the reference integrity metric, and responding to an attestation request with an attestation response including dynamic information from the platform configuration register that was reset and system state information from a non-resettable platform configuration register.

In an exemplary aspect of the invention, there is an apparatus, comprising: at least one data processor; and at least one memory including at least one program of computer instructions, where the at least one memory and the at least one program of computer instructions are configured, with the at least one data processor, to cause the apparatus to at least: establish and initialize a set of platform configuration registers, where a first subset of platform configuration registers is defined as being non-resettable, and a second subset of platform configuration registers is defined as being resettable, store initial boot-up system state information in one or more non-resettable platform configuration registers, dynamically reset a value of a platform configuration register identified by a reference integrity metric to reflect a measurement value provided by the reference integrity metric, and respond to an attestation request with an attestation response including dynamic information from the platform configuration register that was reset and system state information from a non-resettable platform configuration register.

In another exemplary aspect of the invention, there is an apparatus, comprising: means for establishing and initializing a set of platform configuration registers, where a first subset of platform configuration registers is defined as being non-resettable, and a second subset of platform configuration registers is defined as being resettable, means for storing initial boot-up system state information in one or more non-resettable platform configuration registers, means for dynamically resetting a value of a platform configuration register identified by a reference integrity metric to reflect a measurement value provided by the reference integrity metric, and means for responding to an attestation request with an attestation response including dynamic information from the platform configuration register that was reset and system state information from a non-resettable platform configuration register.

In still another exemplary aspect of the invention, there is at least one non-transitory memory embodying at least one program of computer instructions, the at least one program of computer instructions executed by at least one data processor to perform operations comprising: establishing and initializing a set of platform configuration registers, where a first subset of platform configuration registers is defined as being non-resettable, and a second subset of platform configuration registers is defined as being resettable, storing initial boot-up system state information in one or more non-resettable platform configuration registers, dynamically resetting a value of a platform configuration register identified by a reference integrity metric to reflect a measurement value provided by the reference integrity metric, and responding to an attestation request with an attestation response including dynamic information from the platform configuration register that was reset and system state information from a non-resettable platform configuration register.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
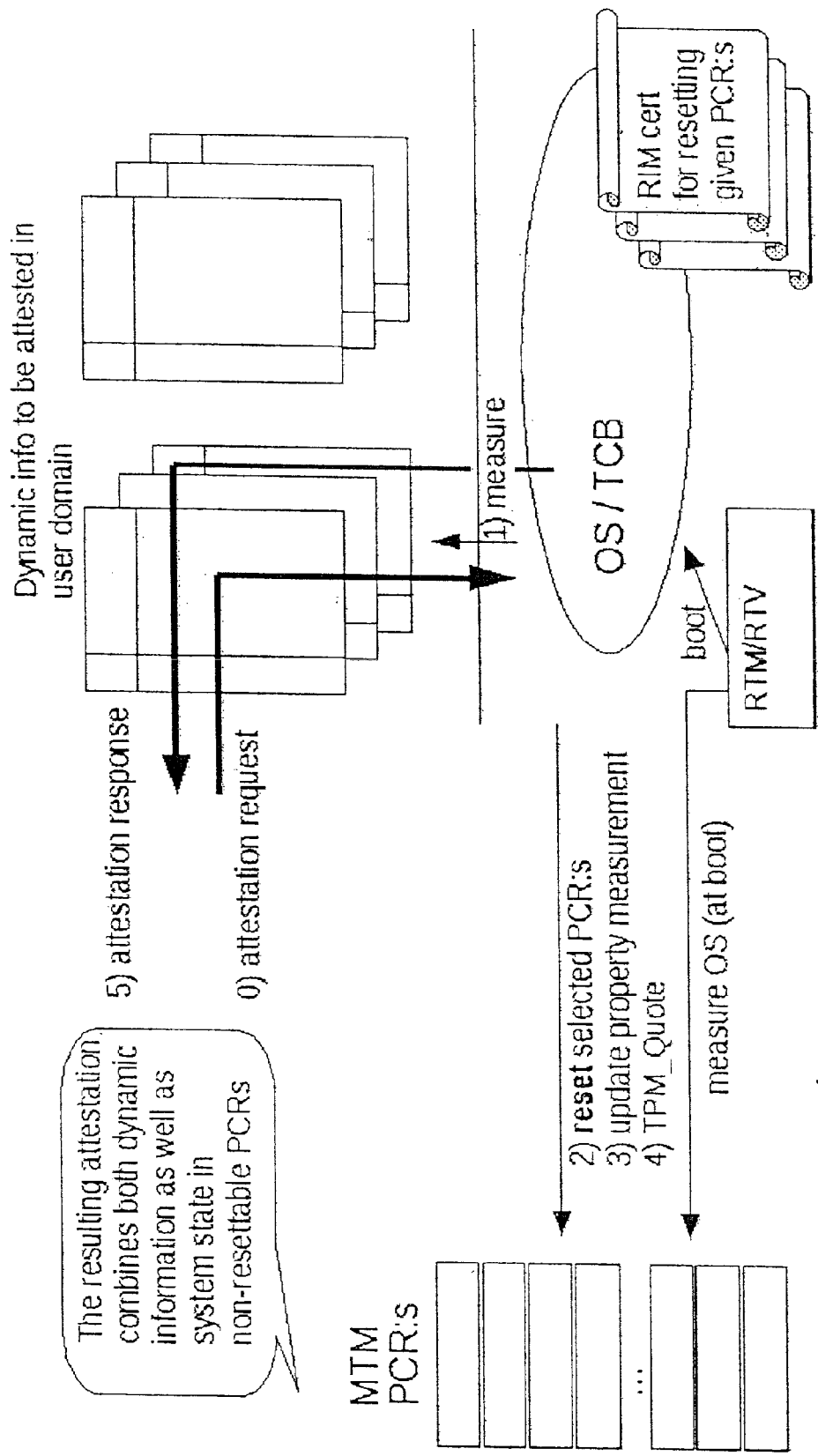
FIG. 1 presents a general use case architecture in which the exemplary embodiments of this invention can be realized.

It would therefore be desirable to provide techniques that use cases (real world use cases) for resetting PCRs in a TCG MTM, and further enable the incorporation of this property into a specification. The exemplary embodiments of the invention encompass these techniques.

It should be clear that some PCR resetting feature would benefit mobile devices and MTM in the same way that DRTM has found its "non-intended use" with TPMs. Reference with regard to MTM can be made, for example, to Trusted Computing Group Mobile Trusted Module (MTM) Specification, Version 1.0 Revision 6, 26 Jun. 2008, and to Trusted Computing Group, TCG Mobile Reference Architecture Specification, Version 1.0 Revision 1, 12 Jun. 2007.

It may be argued that a similar concept could be derived based on "throwaway" MTMs. While in principle this may be true, such an approach would fall short with respect to remote attestation, which typically is fundamental for any TPM/MTM activity, at least those that relate to network or communication services. As a non-limiting example, consider a case where an application would be measured into its own, short-lived, MTM which is most likely in turn rooted (in a trust sense) at a system MRTM. Now, the MTMs themselves would be as "fresh" as needed, and the attestation of their respective state would be painless for a remote attestor. But, since these MTMs (and all prior instances of them as well) would also have to be measured into the system MRTM for binding the trust, the issue of the infinite measurement chain (and the corresponding difficulty of attesting) simply moves to another place in the system, and the resettability feature would be still be needed.

The MTM is not defined by HW/SW features but rather by the various trust roots. For the issue of resetting PCRs this can, with no loss of generality, be assumed to be handled by the RTM. Some added functionality and logic are needed, since in many cases the most simple "measure before execute" principle must be augmented with MTM event update features taking place, (e.g., when an application has terminated, or when some other internal or external condition is satisfied). This is, however, compatible with how TPM/MTMs are envisioned to be used during a boot. For example, in contemporary BIOS measurements the activity of adding an event when a function has been successfully run to completion is present.

The ability to reset a PCR can, in one simple instantiation, be performed at the granularity of one MTM. In this case the assumption is that this specific MTM (its context) is measured in an upper-level MTM, and this measurement is not altered as the PCRs are reset. However, for attestation purposes the feature that the PCRs are resettable in this specific MTM needs to become visible, both for the local examiner and a possible remote attestor.

In accordance with an aspect of the exemplary embodiments of this invention, a most promising mechanism uses the available TPM v1.2 command TPM_RESET_PCR as a starting point. This command resets a selection of PCRs that are resettable if allowed by a fixed PCR attribute, by commands originating from a matching locality (the locality required is another fixed PCR attribute). The following addition and modification options can be considered in the scope of MTM, acknowledging the fact that locality appears to have caused problems at least for the first specification round (considered later).

1). In that the verifiedPCRs list in MTM can in some cases be updated with the MTM_setVerifiedPCRs, one could argue that also the set of resettable PCR:s could be more dynamic than with TPM:s, where the defacto resettable PCR list is for now always governed by the DRTM mechanism (PCRs 18-24). One option is to add a command like MTM_setResettablePCRs.

2. Although it can be argued that the list of verified_PCRs is not necessarily needed in a remote attestation (since the PCRs represent the state independently of any local access control), the same cannot be said of the list of reset PCR:s—that information is quite necessary or at least desired as a part of a remote attestation. This information is, in TPM, conveyed based on the initial/reset base value of the PCR. The concept is easily translatable to MTM, and in the spirit of TPM, non-resettable PCRs can be set to 0x000 . . . 000 at boot-up, and resettable PCRs initialized to 0xFFF . . . FFF when reset. This conveys sufficient information for the attestor to determine whether a PCR has been re-set or not.

3. From the attestor's point of view it makes little difference to know which PCRs are resettable, instead the importance lies in the knowledge of which PCRs have been reset. For the platform owner, a reset PCR is however always a way to delete history, an argument that at least makes it advisable to provide the option to be able to define non-resettable PCRs. In this light, one option is to not define an explicit resettablePCRs vector, but rather to say that the mechanism of resetting the PCR is done in the spirit of MTM_incrementBoostrapCounter—as a command that takes a RIM certificate for resetting a PCR as an argument. This logic follows through into the capabilities of verification keys—the right to make a RIM certificate usable for resetting a given PCR (conditioned on a given system state), can be governed by a capability bit in the verification key structure. Optionally, the extension value in the RIM certificate could be used to immediately extend the reset PCR, to leave a permanent trace of the RIM certificate that reset the PCR, (i.e., indicating indirectly which state was active at the time of reset).

4. The option to re-set any MTM PCR is considered against the following comment in the specification (Version 1, Release 6):

"Nevertheless, localities MUST NOT be used whenever verified PCRs are involved. A PCR may be a verified PCR (have its index bit set in the MTM_PERMANENT_DATA-) verifiedPCRs) OR that PCR may have a localityModifier set. A PCR can of course also have no locality bits set and not be a verified PCR. However, a PCR MUST NOT be a verified PCR AND have a locality Modifier set. Especially, the TPM_PCR_Reset command MUST NOT work for verified PCRs. Verified Extends allow one to conclusively check from a verified PCR whether an event has been recorded into the same or another verified PCR or not. Allowing TPM_PCR_Reset for verified PCRs would prohibit this."

In accordance with the exemplary embodiments of this invention, in order to provide a consistent setup, a currently preferred (but non-limiting) technique for integrating PCR resetting in MTM is outlined as follows:

1. The initial value of all MTM PCR after boot is 0x000 . . . 000 (as currently specified).
2. Any PCR reset after boot is initialized with the value 0xFFF . . . FFF (following the strategy of TPM v.1.2).

3. In line with the PCR attributes of TPM, a number of low-index PCRs (e.g., the first 4 or 8) are defined to not be resettable. This is only for convenience and added security, and one can assume that these PCRs always are intended to be used for capturing the system boot-up state (whatever the "system" may be). All further PCRs are defined to be resettable in principle. One format for this can be to define a PCR attribute, e.g., as

```
typedef struct tdMTM_PCR_ATTRIBUTES{BOOL perReset;}
    MTM_PCR_ATTRIBUTES.
```

4. The ban on not allowing a PCR on the verified PCR list to be resettable is removed, since resettable PCRs can also benefit from the integrity protection (between boot-ups) provided by RIM certificates.

5. A PCR is reset using a new command, referred to for convenience as MTM_resetPCR. The format of this command can be modeled after MTM_incrementBoostrapCounter, since their syntax is similar. The RIM certificate operates in a normal fashion, with measurementPcrIndex denoting the PCR to be reset, and measurementValue including the value to be extended into the PCR reset to the value 0xFFF . . . FFF.

6. The verification key structure is augmented with a definition:
TPM_VERIFICATION_KEY_USAGE_RESET_PCR
0x0008 to govern the use of a verification key for resetting PCR:s using the new command MTM_resetPCR.

This approach, in accordance with an aspect of the exemplary embodiments, provides the needed functionality in a most standards-compliant way by re-using as much as possible from the existing TPM specification, but at the same time maximizing the use of the existing features of MTM (RIM Certificates), and handling the issue of locality not being a well-established part of the MTM specification. This approach does not fix the resettable PCR:s in a rigid fashion, but leaves it to the MTM owner (the device integrator) to decide the policy by which verification keys (and thereby RIM certificates) are allowed to reset parts of the PCR space. In general, rigidity can still be achieved at the manufacturer level, should it in some cases be desired.

Reference is now made to FIG. 1 for an explanation of one non-limiting use case.

Consider a case where an operating system (OS) needs a remote party to attest to which applications (of a set) are running. It can be assumed that the OS itself is securely booted, based on the principles of MTM, and has reached a state where it has one or several MRTM:s active, and the system state is logged into it in the form of PCR updates with or without RIM certificates. From this point onwards the system needs to keep track of applications launching and terminating over time, based on user activity or other events. A traditional approach to achieving this kind of tracking is to build on architectures such as IMA, but these either accumulate large amounts of data (measurement log) to be compared against the attestation, or as in the case of IMA they do not trace the dynamic state of the system. Instead, they only guarantee the integrity, i.e., measure first-application-use only.

Assuming the use of the PCR resetting facility as described above with respect to the exemplary embodiments, the present example use case can be much better supported by MTM. For example, an array of MTMs is set up, bound to the base MRTM by, for example, measuring their respective state information along with some identification value into the base MRTM. Any attestation is now a combination of two TPM_QUOTE commands, one from the base MRTM attesting the state of the OS, and the binding to the more dynamic application-attesting MTM, and a second one from a relevant application-attesting MRTM.

Each application-attesting MRTM is used by the OS to trace a few specific applications, possibly clustered by some property or application type. One very straightforward approach is to log an event regarding the application into a dedicated, resettable PCR both on launch and on application termination, preferably as different events for these respective actions. Thus, by examining the PCR in question, and the events logged into it, an attestor can easily examine whether one or several application instances of this type are active at the time of attestation. Equivalently, a trusted operating system daemon can bind the size of the information content in the PCRs, by examining them at leisure. Whenever application launches and terminations balance each other out, the corresponding PCR can safely be reset. However, even in a case that the launches and terminations do not balance each other out, the daemon can still reset the PCR and re-add the difference to the PCR in question.

In FIG. 1 the various numbered operations are as follows. Initially the OS is measured at boot-up time by the RTM/RTV and the result stored in (non-resettable) MTM PCR:s. Assume then the presence of dynamic information to be attested in the user domain. At (0) there is an attestation request. At (1) a measurement is made by the OS/TCB. It is assumed that there exists a RIM certificate for resetting certain PCR:s. At (2) the selected PCR:s is reset, and at (3) an update is made of the property measurement made at (1). The TPM_Quote command is executed at (4), and at (5) the attestation response is returned. The resulting attestation combines both dynamic information as well as system state in the non-resettable PCR:s. The resetting operation optionally includes the RIM certificate update value.

It can be noted that the exemplary embodiments do not contradict, for example, IMA, and in fact can operate in parallel with IMA. In this manner a "snapshot" of the dynamic state of the system can be obtained, whereas IMA provides the proofs needed for application integrity and to some degree a statement of system integrity by listing all applications that have been launched at least once.

The question may arise as to whether MTMs or TPMs should be used for more dynamic attestation activities at all, as the boot-up could be governed by a traditional MTM and the dynamism could then be resolved by any proprietary or otherwise specified mechanism, better suited for the task. While at first glance this may appear to be a viable approach, the following arguments for the use of the procedure in accordance with the exemplary embodiments of this invention should be considered.

A. The entire architecture can be formalized by using TCG concepts. This makes the attestation activity much more straight-forward, since only one way of looking at data (PCRs) needs to be included.

B. MTM provides the RIM certificates that can be used as a tool for configuration, e.g., to define event formats. RIM certificates are integrity-protected by design, so are not subject to modification threats even though they, as data, are not typically protected by trust measurements.

C. In mobile platforms the MTMs (as state storage) can often be better protected than the OS memory. Thus the attestation statements are more reliable, if done with MTMs.

D. Dynamism is not applicable to only OS concepts. For example, a typical use case with TPMs/MTMs is to limit access to RSA keys (key usage). Here, keys are defined to be accessible in a certain system state, but when the state has been reached, after the actual key usage, the PCR state can be garbled to ensure that the key cannot be used until the state is reached again, traditionally in next reboot (as conventional PCRs cannot be reset). However, for some keys and their uses this is clearly too restrictive, and there may be a need to reuse the key later during the uptime of the TPM/MTM. Clearly, the ability to reset the PCRs can be beneficial for supporting these and similar use cases. The argument also becomes even stronger if MTMs ever include trusted execution environments (TrEE:s) for dedicated algorithms and other code.

Figure 2:
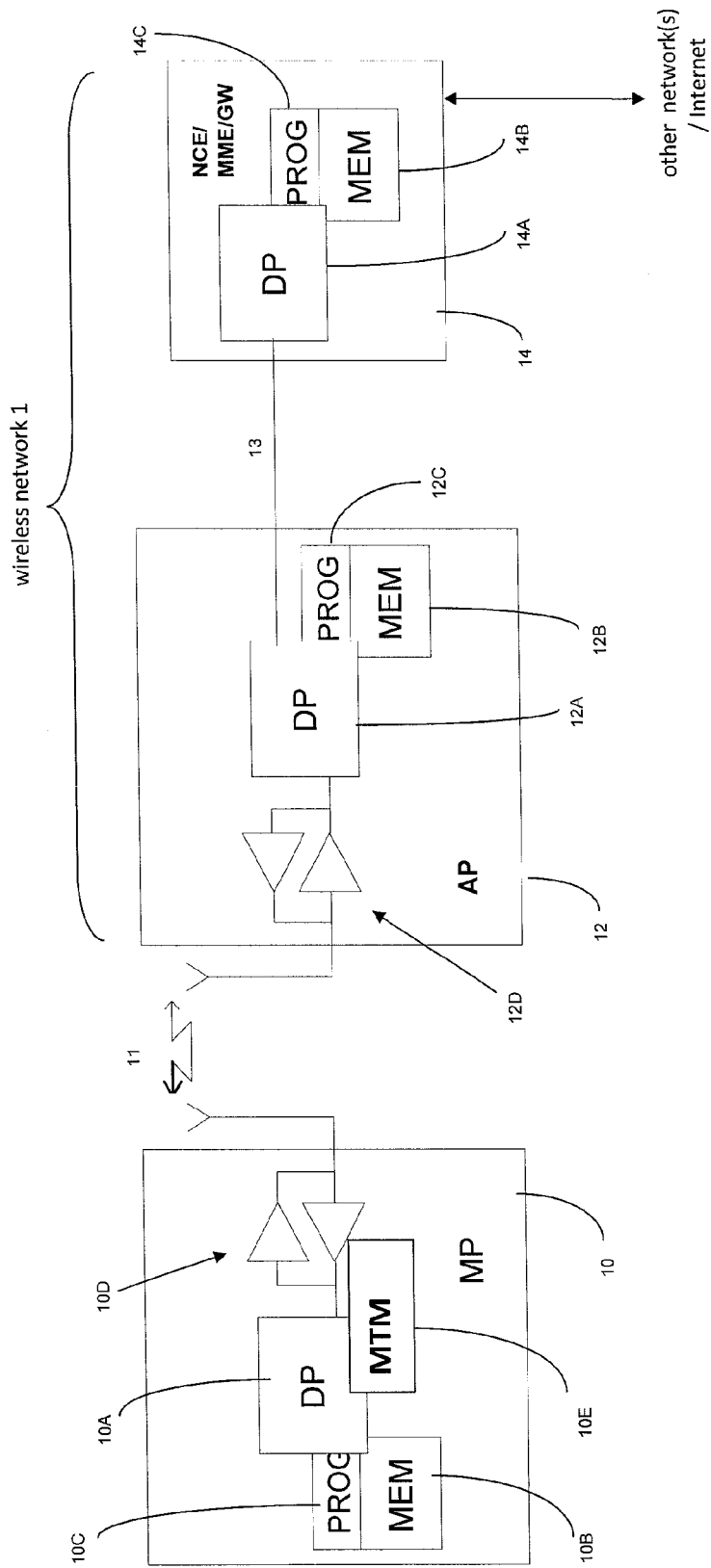
FIG. 2 is a simplified block diagram showing a mobile platform and an access point, where the mobile platform includes a MTM operated in accordance with the exemplary embodiments of this invention.

FIG. 2 shows an example of a mobile platform (MP) 10 that is in wireless communication via link 11 with an access point (AP) 12 of a wireless network 1. The network 1 may include a network control element (NCE) 14 that may include mobile management entity (MME)/gateway (GW) functionality and which can provide connectivity with a further network, such as a telephone network and/or a data communications network (e.g., the internet). The MP 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the AP 12 via one or more antennas. The AP 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the MP 10 via one or more antennas. The AP 12 is coupled via a data/control path 13 to the NCE 14.

For the purposes of describing the exemplary embodiments of this invention the MP 10 may be assumed to also include a MTM 10E that can be implemented in HW, SW or as a combination of HW and SW (and firmware). The program 10C can implement an OS, as well as, for example, all or some of the functionality of the MTM 10E. The MTM 10E is assumed to operate in accordance with the exemplary embodiments of this invention so as to enable at least some MTM PCRs to be made resettable. The MTM PCRs can be realized as memory locations in the memory 10B, or as HW registers, or as a combination of memory locations and HW registers.

In general, the various embodiments of the MP 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples. All or some of the functionality of the MP 10 and the AP 12 shown in FIG. 2 can be implemented in one or more respective ASICs.

Based on the foregoing it should be apparent that the exemplary embodiments of this invention provide a method, apparatus and computer program(s) to enhance the operation of a data processing system that is involved with a mobile trusted module. The exemplary embodiments provide for the augmentation of RIM certificates and verification keys to control PCR resetting in a fine-grained and dynamic manner. The resetting of the PCR(s) can be controlled by the platform manufacturer.

Figure 3:
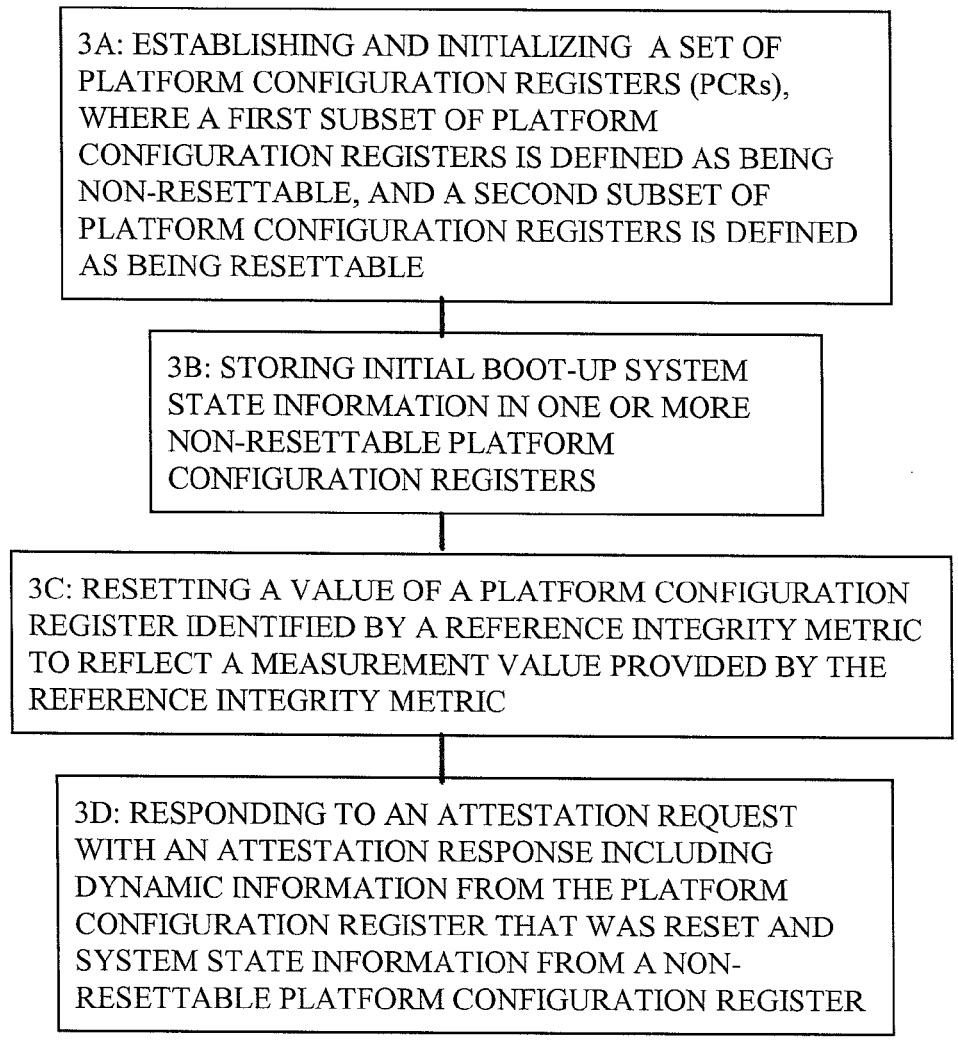
FIG. 3 is a logic flow diagram that illustrates the operation of a method, and a result of execution of computer program instructions, in accordance with the exemplary embodiments of this invention.

FIG. 3 is a logic flow diagram that illustrates the operation of a method, and a result of execution of computer program instructions, in accordance with the exemplary embodiments of this invention. In accordance with these exemplary embodiments a method performs in a mobile trusted module (MTM), at Block 3A, a step of establishing and initializing a set of platform configuration registers (PCRs), where a first subset of platform configuration registers is defined as being non-resettable, and a second subset of platform configuration registers is defined as being resettable. At Block 3B there is a step of storing initial boot-up system state information in one or more non-resettable platform configuration registers. At Block 3C there is a step of dynamically resetting a value of a platform configuration register identified by a reference integrity metric to reflect a measurement value provided by the reference integrity metric. At Block 3D there is a step of responding to an attestation request with an attestation response including dynamic information from the platform configuration register that was reset and system state information from a non-resettable platform configuration register.

The method as depicted in FIG. 3, where a platform configuration register is defined as being resettable using a platform configuration register attribute:

```
typedef struct tdMTM_PCR_ATTRIBUTES{BOOL perReset;}
MTM_PCR_ATTRIBUTES.
```

The method of the preceding two paragraphs, where resetting the platform configuration register is in response to a MTM_resetPCR command.

The method of the preceding paragraph, further comprising augmenting a verification key structure with a definition:
TPM_VERIFICATION_KEY_USAGE_RESET_PCR
0x0008
to govern the use of a verification key for resetting PCR:s using the commandMTM_resetPCR.

The various blocks shown in FIG. 3 may be viewed as method steps, and/or as operations that result from operation of computer program code, and/or as a plurality of coupled logic circuit elements constructed to carry out the associated function(s).

The exemplary embodiments of this invention also provide an apparatus that comprises a processor and a memory including computer program code, where the memory and computer program code are configured to, with the processor, cause the apparatus at least to perform, establishing and initializing a set of platform configuration registers, where a first subset platform configuration registers is defined as being non-resettable, and a second subset of platform configuration registers is defined as being resettable; storing initial boot-up system state information in one or more non-resettable platform configuration registers; resetting a value of a platform configuration register identified by a reference integrity metric to reflect a measurement value provided by the reference integrity metric; and responding to an attestation request with an attestation response including dynamic information from the platform configuration register that was reset and system state information from a non-resettable platform configuration register.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names. Further, the formulas and expressions that use these various parameters may differ from those expressly disclosed herein. Further, the various names assigned to different commands (e.g., MTM_resetPCR, etc.) are not intended to be limiting in any respect, as these various commands may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
establishing and initializing a set of platform configuration registers, where a first subset of platform configuration registers is defined as being non-resettable, and a second subset of platform configuration registers is defined as being resettable;
storing initial boot-up system state information in one or more non-resettable platform configuration registers;
dynamically resetting a value of a platform configuration register identified by a reference integrity metric to reflect a measurement value provided by the reference integrity metric; and
responding to an attestation request with an attestation response including dynamic information from the platform configuration register that was reset and system state information from a non-resettable platform configuration register.

2. The method according to claim 1, wherein a platform configuration register is defined as being resettable using a platform configuration register attribute:

typedef struct tdMTM_PCR_ATTRIBUTES{BOOL perReset;} MTM_PCR_ATTRIBUTES.

3. The method according to claim 1, wherein resetting the platform configuration register is in response to a MTM_resetPCR command.

4. The method according to claim 3, where the resetting includes a reference integrity metric certificate update value.

5. The method according to claim 3, further comprising augmenting a verification key structure with a definition:
TPM_VERIFICATION_KEY_USAGE_RESET_PCR 0x0008
wherein the augmenting with the definition governs the use of a verification key for resetting PCR:s using the command MTM_resetPCR.

6. An apparatus, comprising:
at least one data processor; and
at least one memory including at least one program of computer instructions, where the at least one memory and the at least one program of computer instructions are configured, with the at least one data processor, to cause the apparatus to at least:
establish and initialize a set of platform configuration registers, where a first subset of platform configuration registers is defined as being non-resettable, and a second subset of platform configuration registers is defined as being resettable;
store initial boot-up system state information in one or more non-resettable platform configuration registers;
dynamically reset a value of a platform configuration register identified by a reference integrity metric to reflect a measurement value provided by the reference integrity metric; and
respond to an attestation request with an attestation response including dynamic information from the platform configuration register that was reset and system state information from a non-resettable platform configuration register.

7. The apparatus according to claim 6, wherein a platform configuration register is defined as being resettable using a platform configuration register attribute:

typedef struct tdMTM_PCR_ATTRIBUTES{BOOL perReset;} MTM_PCR_ATTRIBUTES.

8. The apparatus according to claim 6, wherein reset the platform configuration register is in response to a MTM_resetPCR command.

9. The apparatus according to claim 8, where the reset includes a reference integrity metric certificate update value.

10. The apparatus according to claim 8, further comprising the at least one memory including the at least one program of computer instructions is configured, with the at least one data processor, to cause the apparatus to augment a verification key structure with a definition:
TPM_VERIFICATION_KEY_USAGE_RESET_PCR 0x0008,
wherein the augment with the definition governs the use of a verification key for resetting platform configuration registers using the command MTM_resetPCR.

11. The apparatus according to claim 6, wherein the apparatus comprises a mobile trusted module disposed within a mobile platform.

12. At least one non-transitory memory embodying at least one program of computer instructions, the at least one program of computer instructions executed by at least one data processor to perform operations comprising:
establish and initialize a set of platform configuration registers, where a first subset of platform configuration registers is defined as being non-resettable, and a second subset of platform configuration registers is defined as being resettable;
store initial boot-up system state information in one or more non-resettable platform configuration registers;
dynamically reset a value of a platform configuration register identified by a reference integrity metric to reflect a measurement value provided by the reference integrity metric; and
respond to an attestation request with an attestation response including dynamic information from the platform configuration register that was reset and system state information from a non-resettable platform configuration register.

13. The at least one non-transitory memory embodying at least one program of computer instructions of claim 12, wherein a platform configuration register is defined as being resettable using a platform configuration register attribute:

typedef struct tdMTM_PCR_ATTRIBUTES{BOOL perReset;} MTM_PCR_ATTRIBUTES.

14. The at least one non-transitory memory embodying at least one program of computer instructions of claim 12, wherein reset the platform configuration register is in response to a MTM_resetPCR command.

15. The at least one non-transitory memory embodying at least one program of computer instructions of claim 14, where the reset includes a reference integrity metric certificate update value.

16. The at least one non-transitory memory embodying at least one program of computer instructions of claim 14, further comprising augment a verification key structure with a definition:
TPM_VERIFICATION_KEY_USAGE_RESET_PCR 0x0008 wherein the augment with the definition governs the use of a verification key for resetting platform configuration registers using the command MTM_resetPCR.

* * * * *